March 25, 1969 S. J. WHITTAKER ET AL 3,434,194
METHOD OF FORMING JOINT BETWEEN TUBE AND FITTING
Filed Nov. 9, 1966
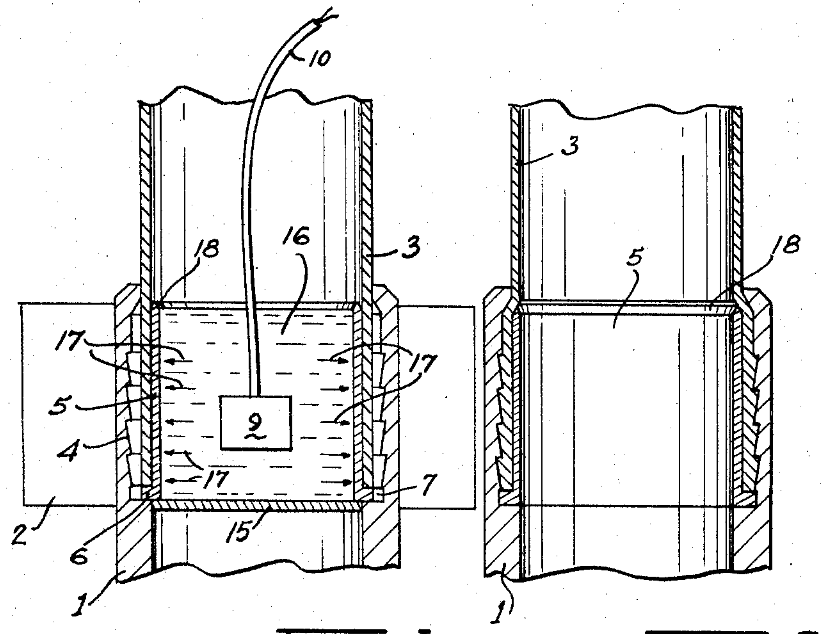
Fig. 1.
Fig. 2.
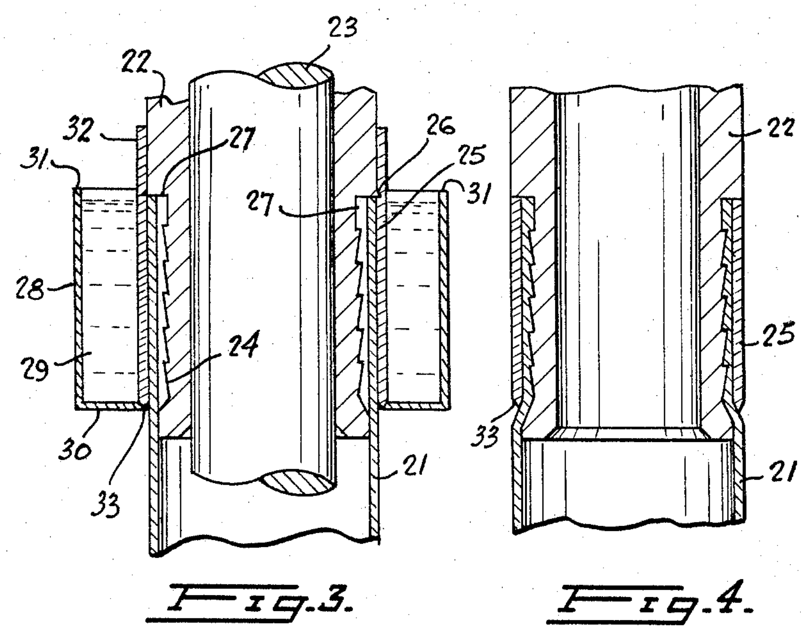
Fig. 3.
Fig. 4.
INVENTORS.
STANLEY J. WHITTAKER
CECIL RHODES
Kimmel, Crowell & Weaver
ATTORNEYS.

United States Patent Office 3,434,194

Patented Mar. 25, 1969

3,434,194

METHOD OF FORMING JOINT BETWEEN TUBE AND FITTING

Stanley James Whittaker, 2 Cartier Circle, and Cecil Rhodes, 35 Frontenac Crescent, both of Deep River, Ontario, Canada Filed Nov. 9, 1966, Ser. No. 593,172
Int. Cl. B23p *11/00;* B23k *21/00;* B21d *39/00*
U.S. Cl. 29—421 6 Claims

ABSTRACT OF THE DISCLOSURE

A method of forming a joint between a tube and fitting in which the tube material is of low-ductility and subject to brittleness after plastic distortion in which an interface area wth a chosen profile is defined in the fitting, the tube is embraced by a ring in the interface area and the ring and tube are subsequently distorted into contact with the fitting, uniformly and at high velocity. The fitting is shaped in the interface area so that the ring and tube distort sufficiently that the limiting cross-sectional width of material in the interface area is the same as that of the undistorted tube. Uniform high velocity distortion may be achieved by an explosive which may be liquid-coupled to the ring and tube for accomplishing the distortion.

This invention relates to a method for joining tubes. It has particular reference to a method of high energy plastic deformation of a tube into joining contact with an adjacent fitting.

In the past, difficulty has been experienced in making joints to thin-walled heat treated Zr-Nb alloy tubes for nuclear reactors, particularly between heat treated Zr–2.5% Nb and stainless steel. These materials have low ductility, and the zirconium alloy is subject to hydride orientation changes when stressed unduly. A number of stringent conditions have also to be met.

The strength of the joint in axial loading must approach that of the tube. The joint must have a high yield strength in axial tension, which may be developed by internal pressure or by other loads. There must be high leak resistance. These conditions must be met over a wide range of temperatures and pressures (up to 1500 p.s.i.g. and 300° C.) Welding, brazing or other bonding is impractical because of its effect on the properties of the heat treated pressure tube, and because of contamination from sealing and fluxing compounds. A threaded type of joint is unacceptable.

Under present procedures, the normal way of connecting a tube and fitting of this type would be by using a rolled joint. In such a joint it is general to groove the fitting into which the tube is to be received, and then distort the tube into the fitting and into the groove. Where the tube is so thin that insufficient residual sealing force is present in the tube after distortion, the joint is made to consist of a sandwich in which a ring member is placed on the opposite side of the tube to that of the fitting and distorted along with the tube so that the tube is held nipped between this ring member and the fitting.

In joining Zr-Nb alloys, there is a severe limitation on the amount of expansion that can be given to the tube because of the low ductility, and hydride orientation changes which lead to brittleness. Using the sandwich construction the tube must first be distorted to accommodate the ring member, and then be deformed a second time to its nipped position in the fitting. The rolling action, apart from the two deformations, also causes axial flow in both the ring member and the tube. This flow interferes with the sealing effect, and limits the choice of interface profile between tube and fitting. Relative rotation between tube and fitting also occurs and reduces the sealing effect.

A new method for joining tubes of low ductility in which only a small amount of distortion can be accepted, is provided by the present invention. Two types of joint can conveniently be made using the invention. The first involves a joint in power reactor fuel channels, in which the joint must have an inside diameter that is not less than that of the tube associated with it. In a second situation for pressure tubes in a reactor which are to be replacable, a joint is required in which the outside diameter shall be no greater than that of the tube to which it is connected.

In carrying out the teaching of the invention, a novel and inventive form of a simple and a sandwich joint for low ductility tubes has been developed.

Reference will now be made to the accompanying drawings in which:

FIGURE 1 shows a loosely assembled tube and fitting, together with an inner sandwich member before expansion of the tube, FIGURE 2 shows the joint of FIGURE 1 after the tube has been flowed into sealing position, FIGURE 3 shows a second form of joint in which the outer diameter of the fitting is to be no larger than that of the tube before deformation of the tube into sealing position, and FIGURE 4 shows the completed joint of FIGURE 3.

With reference now to FIGURE 1, a fitting 1 is held within die 2 and has inserted into it a tube 3 which is to be expanded into contact with the fitting for sealing against the grooved face 4 formed in the fitting. A back-up ring 5 is inserted into and is a press fit in the tube, and has an overlapping positioning flange 6. The ring is chamfered at its top rim 18. The flange 6 is accommodated adjacent a ring 7 formed in the fitting 1. An explosive charge 9 with detonating lead 10 is inserted into the ring 5. A pressure retaining disc 15 is introduced into the fitting 1 against the bottom of tube 3. Water 16 is placed into the the ring 5 up to the level of the top rim 18.

If the charge 9 is now detonated, pressure will be transmitted through the water and forces will act on the ring 5 in the direction shown by the arrows 17 causing the ring and tube to flow plastically and take up the shape shown in FIGURE 2. The fitting 1 is then withdrawn from the die 2 (the disc 15 having been blown out).

This arrangement produces a joint in which the diameter of the inner ring 5 is no smaller than that of the tube 3, nor of the fitting 1. The chamfer at rim 18 ensures that there is no abrupt step or change in diameter within the tube and joint. It will be understood that although an explosive charge 9 has been suggested as the source of expansion pressure, in some instances it may be suitable to use simple hydraulic or other rapidly developed high pressure for the expansion of the ring 5. The advantage of expanding the joint in this fashion is that the expansion is achieved at a high rate so that all parts conform closely to one another, the forming of the tube is done in place so that the amount of finishing required is minimal. At worst only a small amount of finish rolling will be needed in which there will be no relative rotation between the fitting and tube. Because of the axial symmetry of the expansion process, the joint will be axially symmetrical after the expansion. This is not possessed by joints entirely formed by rolling.

When it is necessary to join a tube to a fitting in which the outer diameter of the joint is no greater than that of the tube, the scheme shown in FIGURE 3 is employed. The tube 21 is received on a fitting 22, which is placed on a mandrel 23. Grooves 24 are formed in the fitting 22 for reception of the tube upon contraction. A nip-ring 25 surrounds the tube 21 and has a shear groove 26 formed in it, adjacent a circumferential step 27 formed in the fitting 22. The ring is chamfered at its lower rim 33.

An explosive strip 28 is placed outside the ring 25 and is coupled to it by a water annulus 29, (the water being held in position by an annular disc 30), which extends along the fitting the length of the grooved depression 24. For proper operation, the explosive strip 28 must be detonated on one edge simultaneously all around its circumference. This can be achieved by coupling a line wave generator to the circumferential edge 31. These generators are available commercially and consist of a perforated triangular sheet of explosive, which, when detonated at one apex create a detonation front, which arrives at the opposite side of the triangle in a straight line. A line wave generator is thus made up with its side equal to the circumference of the edge 31 to which it is attached. Upon detonation the longitudinally extending part 32 of ring 25 provides a protection at the end of the joint against water and explosion products when the pressure wave hits the joint over the area contacted by the water. Ring part 32 is sheared off during the forming action when the step 27 cuts into the notch 26, it is not disturbed by the pressure wave appreciably and can be slid off the fitting 22. The mandrel 23 is then withdrawn.

In this embodiment, again, the tube 21 is completely plastic while it is being deformed into the depression 24 at a high rate. The shape of the fitting is changed relatively little, even though its hardness may be less than that of the tube, and the tube conforms accurately to the shape of the fitting with virtually no formation of voids. The outer diameter of tube and fitting is the same and an abrupt step is avoided by the chamfer at 33. If desired, a final internal rolling may be given to the fitting to increase the interface pressure between tube and fitting, but little flow is required since all voids are filled and it is only necessary to increase the residual stresses in the tube and ring.

Tests have shown that joints made in the manner described have had very high tensile strength and have not leaked after considerable thermal cycling. It should be noted that the rings 5 and 25 are not part of either the tube or the fitting, and they can have properties quite different from both. The rings act simply as though the tube wall were thicker in the area of the ring so that the stress given to the tube for a given interface pressure will be lower than otherwise. By choosing a ring material which is less sensitive to creep than the tube, a joint can be made that will be less subject to stress relaxation. With a ring material of suitable coefficient of thermal expansion, high interface pressures can be maintained in both hot and cold conditions. The rings have another useful function in that they fill in space to produce a continuous diameter in each case. This makes it simpler to conveniently roll the joint as required.

The rings also eliminate the step or ridge in the deformed tube, which might otherwise be unacceptable to the joint design.

It will be understood that although this description has concerned sandwich joints, the invention might in some instances be applied to simple joints between two tubes or a tube and fitting where the tube is thick enough that the ring is not required.

We claim:

1. The method of forming a joint between a tube material of low ductility and subject to brittleness subsequent to plastic distortion, and a fitting, which comprises the steps of, removing material from said fitting to provide an interface area with a chosen interface profile, aligning said tube with said fitting adjacent said interface area, embracing said tube by means of a ring in said interface area, supporting said fitting and distorting said ring and said tube uniformly and at high velocity into said interface area, the quantity of material removed from the fitting in the interface area being sufficient to accommodate distorted material of said tube and said ring so that the limiting cross sectional width of material in said interface area is the same as that of the undistorted tube.

2. The method as defined in claim 1, including the additional step of increasing residual stress in said joint by rolling said joint after said distorting step.

3. The method as defined by claim 1 comprising the step of distorting said ring and tube by explosion pressure.

4. The method as defined in claim 1 comprising a liquid coupling means for said ring, an explosive surrounding said liquid, an extension protecting skirt on said ring extending beyond said liquid coupling, said ring being notched for shearing of said skirt from said ring upon detonation of said explosive, and including the step of detonating said explosive.

5. The method as defined in claim 1 comprising, a liquid in contact with and contained by said ring, and explosive in said liquid and including the step of detonating said explosive for distorting said ring and tube uniformly at high velocity.

6. The method as defined in claim 1 including the step of chamfering said ring at one end for preventing abrupt change of diameter between said tube and said ring at said one end.

References Cited

UNITED STATES PATENTS

| | | | |
|---|---|---|---|
| 2,779,279 | 1/1957 | Maiwurm | 29—523 X |
| 3,036,374 | 5/1962 | Williams. | |
| 3,055,095 | 9/1962 | Barry | 29—517 X |
| 3,267,710 | 8/1966 | Inoue | 72—56 |
| 3,377,694 | 4/1968 | Simons et al. | 29—470.1 |

THOMAS H. EAGER, *Primary Examiner.*

U.S. Cl. X.R.

29—470.1, 517, 523; 72—56